(12) United States Patent
Kim (10) Patent No.: US 12,468,302 B2
(45) Date of Patent: Nov. 11, 2025

(54) METHOD AND APPARATUS FOR ASSISTING PROXIMITY SENSOR-BASED PRODUCT PICKING

(71) Applicant: OASIS CO., LTD., Seongnam-si (KR)

(72) Inventor: Young Jun Kim, Seoul (KR)

(73) Assignee: OASIS CO., LTD., Seongnam-si (KR)

( * ) Notice: Subject to any disclaimer, the term of this patent is extended or adjusted under 35 U.S.C. 154(b) by 487 days.

(21) Appl. No.: 18/022,704

(22) PCT Filed: Aug. 26, 2021

(86) PCT No.: PCT/KR2021/011411
§ 371 (c)(1),
(2) Date: Feb. 22, 2023

(87) PCT Pub. No.: WO2022/050631
PCT Pub. Date: Mar. 10, 2022

(65) Prior Publication Data
US 2023/0333565 A1    Oct. 19, 2023

(30) Foreign Application Priority Data

Sep. 3, 2020    (KR) ................ 10-2020-0112497

(51) Int. Cl.
*B65G 1/137* (2006.01)
*G05D 1/00* (2006.01)
*G06Q 10/0875* (2023.01)
*G08B 5/36* (2006.01)

(52) U.S. Cl.
CPC ......... *G05D 1/0223* (2013.01); *B65G 1/1371* (2013.01); *B65G 1/1373* (2013.01); *G06Q 10/0875* (2013.01); *G08B 5/36* (2013.01)

(58) Field of Classification Search
CPC .. G05D 1/0223; B65G 1/1371; B65G 1/1373; B65G 2209/00; G06Q 10/0875; G06Q 10/087; G06Q 10/0832; G06Q 10/10; G08B 5/36
See application file for complete search history.

(56) References Cited

FOREIGN PATENT DOCUMENTS

| CA | 3019159 C | * | 4/2021 | ............. G01C 21/20 |
|---|---|---|---|---|
| JP | 2002-114339 A | | 4/2002 | |
| JP | 4127001 B2 | | 7/2008 | |
| JP | 2010269858 A | * | 12/2010 | |

(Continued)

*Primary Examiner* — Justin Holmes
(74) *Attorney, Agent, or Firm* — Bridgeway IP Law Group, PLLC; Jihun Kim (57) ABSTRACT

A method for assisting proximity sensor-based product picking, comprises: deriving a product to be currently picked from a picking product list; selecting a first user terminal positioned in a first region where the product to be currently picked is displayed; moving a cart including a plurality of picking boxes within a certain distance from the first user terminal; when the cart is positioned within the certain distance from the first user terminal, stopping movement of the cart; providing information about the product to be currently picked to the first user terminal; and when picking completion information is received from the first user terminal, deriving a product to be picked next from the picking product list, wherein a distance between the cart and the first user terminal is determined on the basis of a proximity sensor.

5 Claims, 9 Drawing Sheets

(56) References Cited

FOREIGN PATENT DOCUMENTS

| KR | 101665578 B1 | * | 10/2016 | ............. G05D 1/021 |
| KR | 10-2043801 B1 | | 11/2019 | |
| KR | 10-2253544 B1 | | 5/2021 | |
| WO | WO-2019235347 A1 | * | 12/2019 | ........... B65G 1/1375 |

* cited by examiner

METHOD AND APPARATUS FOR ASSISTING PROXIMITY SENSOR-BASED PRODUCT PICKING

TECHNICAL FIELD

The present invention relates to a method and an apparatus for assisting proximity sensor-based product picking, and more particularly, to a method and an apparatus for assisting product picking by detecting a distance between a cart and a user based on a proximity sensor.

BACKGROUND ART

In the information era, recently, delivery services based on remote orders through the Internet and the like are being activated. The service generally includes a series of procedures of picking products according to an order, packing the picked products, and delivering the packed products to an orderer.

However, as the number or type of orderable products increases, and spaces such as warehouses are loaded with many types of products, it has become difficult to efficiently find and pick the products. In addition, cases in which different packing schemes are used depending on the type of products are increasing, and more cautions are being required, so that it has become difficult to pack the products. Furthermore, schemes for delivering the packed products are diversifying, and particularly, non-face-to-face delivery is spotlighted, whereas cases such as loss may occur. In other words, in such services, various problems are currently occurring in picking, packing, and delivery.

DISCLOSURE

Technical Problem

To solve the problems described above, one object of the present invention is to provide a method for assisting proximity sensor-based product picking.

To solve the problems described above, another object of the present invention is to provide an apparatus for assisting proximity sensor-based product picking.

Technical Solution

To achieve the objects described above, according to one embodiment of the present invention, there is provided a method for assisting proximity sensor-based product picking, which is performed by an apparatus for assisting product picking, the method including: deriving a current picking target product from a picking product list; selecting a first user terminal positioned in a first region where the current picking target product is displayed; moving a cart including a plurality of picking boxes within a predetermined distance from the first user terminal; stopping the movement of the cart when the cart is positioned within the predetermined distance from the first user terminal; providing information on the current picking target product to the first user terminal; and deriving a next picking target product from the picking product list when picking completion information is received from the first user terminal, wherein a distance between the cart and the first user terminal is determined based on a proximity sensor.

To achieve the objects described above, according to one embodiment of the present invention, there is provided an apparatus for assisting proximity sensor-based product picking, the apparatus including: a processor; and a memory for storing at least one command executed through the processor, wherein the at least one command is executed to: derive a current picking target product from a picking product list; select a first user terminal positioned in a first region where the current picking target product is displayed; move a cart including a plurality of picking boxes within a predetermined distance from the first user terminal; stop the movement of the cart when the cart is positioned within the predetermined distance from the first user terminal; provide information on the current picking target product to the first user terminal; and derive a next picking target product from the picking product list when picking completion information is received from the first user terminal, and a distance between the cart and the first user terminal is determined based on a proximity sensor.

Advantageous Effects

According to the present invention, since the cart automatically moves based on the picking target list in search of a specific region for a user or picking, inconvenience of moving to pick another picking target product by users positioned in the specific region can be prevented.

According to the present invention, since the user continuously performs a picking operation within the specific region, the user can be well informed of positions of products within the specific region, so that a speed or efficiency of the picking operation can be improved.

According to the present invention, managements and picking operations can be efficiently performed for many orders from a large-order customer company.

DESCRIPTION OF DRAWINGS

FIGS. 3 to 7 are views showing screens of a user terminal for managing and processing an order from a large-order customer company according to one embodiment of the present invention.

MODE FOR INVENTION

Since various modifications can be made to the present invention, and the present invention may have various embodiments, specific embodiments will be illustrated in the drawings and described in detail through the detailed description. This, however, is by no means to restrict the present invention to a specific disclosed form, and the present invention is to be construed as including all modifications, equivalents, and substitutes within the idea and technical scope of the present invention. Like reference numerals are used for like elements throughout the description of each drawing.

Although terms such as "first", "second", "A", and "B" may be used to describe various elements, the elements are not to be limited by the terms. The terms are used merely for the purpose of distinguishing one element from another element. For example, a first element may be termed as a second element, and similarly, a second element may also be termed as a first element, without departing from the scope of the present invention. The term "and/or" includes any combination of a plurality of described relevant items, or any of the described relevant items.

When one element is described as being "connected" or "accessed" to another element, it is to be construed as being connected or accessed to the other element directly, but also as possibly having another element in between. Meanwhile, when one element is described as being "directly connected" or "directly accessed" to another element, it is to be construed that that is no other element in between.

Terms used herein are used merely to describe specific embodiments, and are by no means to restrict the present invention. Unless the context explicitly indicates otherwise, expressions in a singular form include a meaning of a plural form. In the present disclosure, terms such as "include" or "have" are intended to designate the presence of characteristics, numbers, steps, operations, elements, parts, or combinations thereof described herein, and are not to be construed to preclude any possibility of the presence or addition of one or more other characteristics, numbers, steps, operations, elements, parts, or combinations thereof.

Unless defined otherwise, all terms used herein, including technical or scientific terms, have the same meaning as those commonly understood by a person having ordinary skill in the art to which the present invention pertains. Any terms as those defined in generally used dictionaries are to be interpreted to have the same meanings as the contextual meanings in the relevant art, and are not to be interpreted to have idealistic or excessively formalistic meanings unless explicitly defined otherwise in the present disclosure.

Hereinafter, an exemplary embodiment of the present invention will be described in more detail with reference to the accompanying drawings. In order to facilitate an overall understanding in the description of the present invention, the same reference numerals will be used for the same elements in the drawings, and redundant descriptions of the same elements will be omitted.

Figure 1:
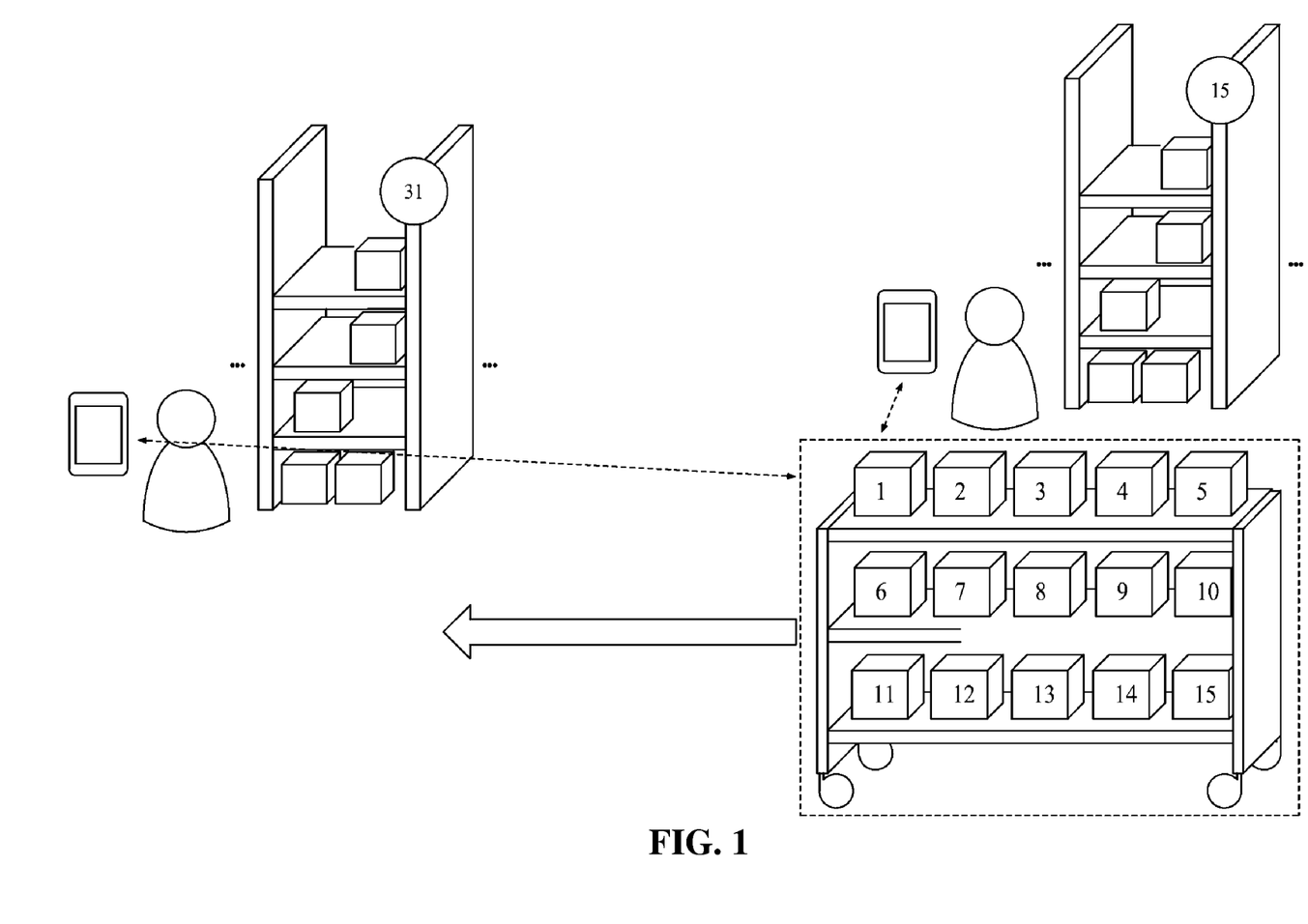
FIG. 1 is a conceptual diagram for describing a method for assisting proximity sensor-based product picking according to one embodiment of the present invention.

FIG. 1 is a conceptual diagram for describing a method for assisting proximity sensor-based product picking according to one embodiment of the present invention.

Referring to FIG. 1, according to one embodiment of the present invention, a user may be positioned in a specific region or zone where a plurality of products are displayed, a cart loaded with at least one picking box may move to the specific region where the user is positioned in consideration of a picking target product, and the user may pick the picking target product in the picking box of the cart moved to the region of the user. In addition, when the user has picked all products that may be picked in the region of the user in the at least one picking box of the cart through a user terminal of the user, picking completion information may be input, and the cart may move to a region of another user to pick a next product based on the picking completion information.

Figure 2:
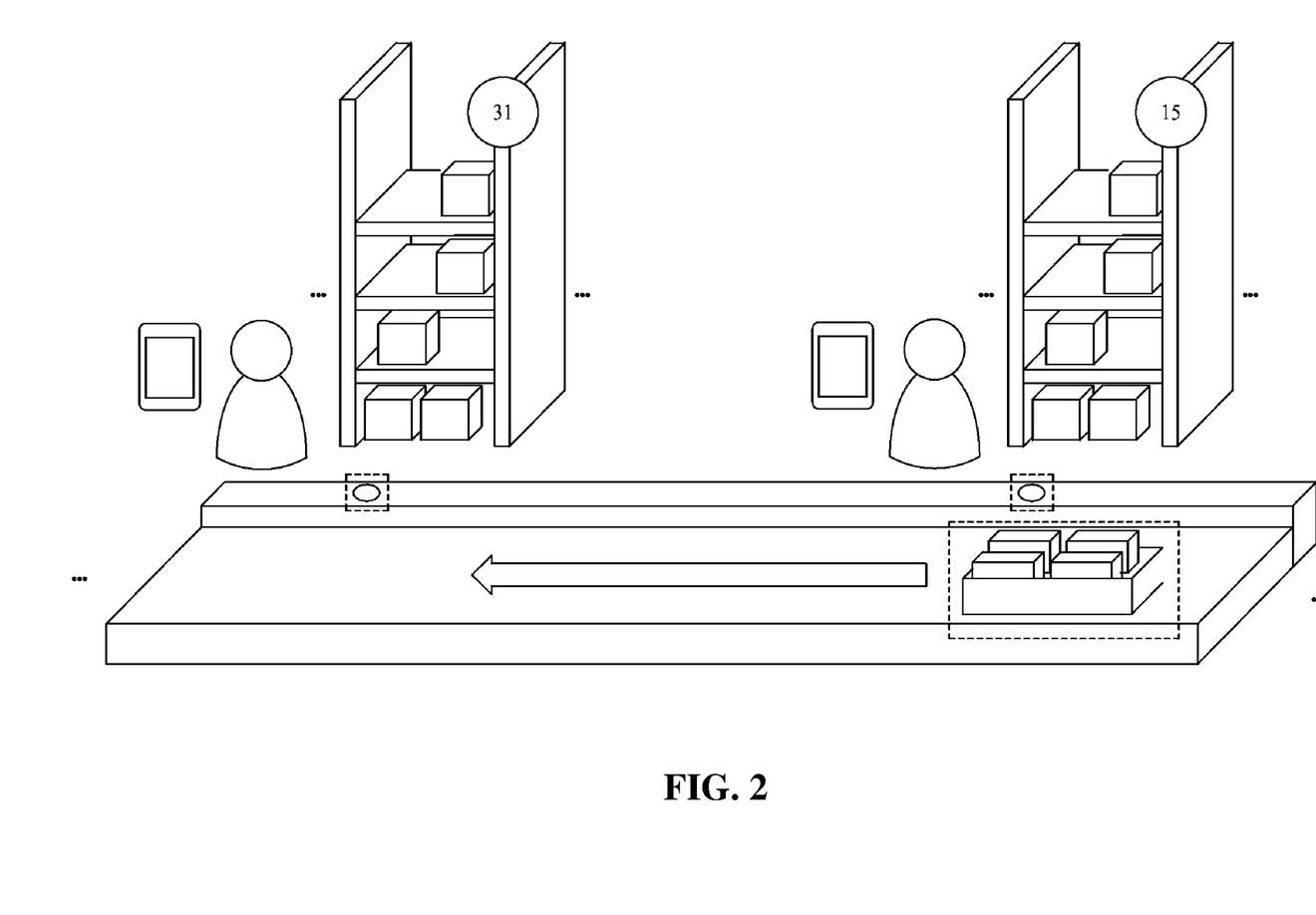
FIG. 2 is a conceptual diagram for describing a method for assisting proximity sensor-based product picking according to another embodiment of the present invention.

In this case, the picking box may be referred to as a basket or a box, and a plurality of picking boxes may be loaded or mounted on the cart so that the picking boxes may be moved together. In this case, the cart may include a communication module, a processing module, and a driving module, and may refer to an apparatus or a device capable of moving at least one picking box at once. Referring to FIG. 1, for example, the cart may be represented as a rectangle formed of dotted lines. However, the cart may vary depending on an embodiment. For example, when the cart moves through a rail as shown in FIG. 2 that will be described below, the cart may not include a separate driving module. This will be described below in detail with reference to FIG. 2.

In other words, according to one embodiment, the picking boxes may be moved together through the cart, which may be more efficient when many products according to a plurality of picking product lists are picked at once.

For example, according to one embodiment, a current picking target product may be derived from a picking target list in order to move to a region where the picking target product is displayed or to a user of the region, and information on a region where the current picking target product is displayed may be obtained based on information on the current picking target product. In this case, the information on the current picking target product may include at least one of a product name of the current picking target product, display region information, display position information, information on a total quantity to be picked in the picking boxes, information on a picking box in which the current picking target product is to be picked among the picking boxes, and information on a quantity of the current picking target product to be picked for each picking box. In addition, according to one embodiment, the cart may move to the displayed region based on the information on the current picking target product, and the information on the current picking target product may be provided to the user terminal to assist the user to appropriately perform a picking operation on the moved cart.

In other words, according to one embodiment, the cart including the picking boxes may move to the region where the picking target product is displayed based on region information of the picking target product, and the user may perform the picking operation on the picking boxes based on information on the picking target product provided through the user terminal. Thereafter, according to one embodiment, the user may input the picking completion information through the user terminal, and according to one embodiment, when the picking completion information is received, the cart including the picking boxes may move to a region where a next picking target product is displayed for a next picking operation. In other words, the next picking target product may be derived from the picking target list, and the cart may move to the region where the next picking target product is displayed based on information on the next picking target product.

In this case, according to one embodiment of the present invention, it may be derived that the cart has reached the region where the picking target product is displayed based on a proximity sensor, and the movement of the cart may be stopped based on derived information. This will be described in more detail as follows.

For example, according to one embodiment, the cart may select the region where the current picking target product is displayed or the user terminal positioned in the region. For example, the user terminal may be selected when the cart moves to the region and stops based on a distance from the user terminal, and the region (i.e., a reference terminal positioned in the region) may be selected when the cart moves to the region and stops based on a distance from another reference object within the region or the reference terminal.

Thereafter, the cart may move toward the reference terminal or the user terminal in the selected region, and may stop when the cart reaches within a predetermined distance from the reference terminal or the user terminal. In other words, when a distance between the cart and the reference terminal or the user terminal is within the predetermined distance, the cart may be determined to reach the region, so that the movement of the cart may be stopped.

In this case, the distance may be derived based on the proximity sensor, and it may be determined whether the distance is within the predetermined distance. Alternatively, for example, the distance may be derived based on a location-based service (LB S)-based proximity sensor.

The user positioned in the specific region may pick picking target products displayed in the specific region on the cart moved to the region of the user. To this end, according to one embodiment, the information on the current picking target product may be provided to the user terminal. Therefore, the user may check the information on the current picking target product, and appropriately pick products positioned in the region of the user for each of the picking boxes loaded in the cart.

In this case, unique serial numbers may be assigned to displayed products in advance according to a type, respectively, and the products may be displayed in an order of the serial numbers. In addition, according to one embodiment, the information on the current picking target product including the serial number of the current picking target product may be provided, and the user may check the serial number to pick the current picking target product.

When the user finishes the picking in the region of the user, the user may input the picking completion information through the user terminal. According to one embodiment, when the picking completion information is received, the next picking target product that has not yet been picked may be derived from the picking target list, and the cart may be moved by selecting the region where the next picking target product is displayed or a user terminal positioned in the region. The above process may be continuously performed until picking of all picking target products in the picking target list is completed, and when the picking of all the picking target products in the picking target list is completed, the cart may move to a packing region.

In addition, for example, according to one embodiment, in order to appropriately move the cart to the specific region or to a specific user terminal, at least one of overall map information, information on a region where a product is displayed to prevent the cart from moving, information on a region where the cart may move, and information on a region where the user may be positioned within the region may be used.

For example, according to one embodiment, the user terminal may include a computable device such as a smartphone or a tablet, that is, a smart device, and functions described above may be provided through an application or a web browser on the smart device. In addition, the user terminal may require mobility or portability for the product picking within the specific region. Therefore, in this case, the user terminal may be a portable device. Alternatively, the user terminal may be a wearable device. In other words, the user terminal may be a device that may be carried by the user or attached to a specific position, and may be checked and manipulated at any time while the user performs the product picking.

Alternatively, for example, according to one embodiment, the cart may automatically move toward the user terminal or the like, and the user may also move together with the cart to perform the picking. In other words, it is obvious that the user may be positioned in the specific region to allow the picking to be performed while the cart moves around, and the user may also perform a product picking operation while the user moves around together with the cart.

For example, the cart may have three or four wheels attached to a bottom surface of the cart so as to be movable, the wheels may be operated by the driving module, and the cart may be moved by the user or automatically moved by mounting the communication module or the processing module on the cart. For example, when the cart is moved by the user, the driving module, a sensing module, or the processing module may be mounted on the cart so that the cart may automatically follow the user.

For example, 15 picking boxes may be loaded on one cart so as to be used, but embodiments are not limited thereto. In other words, various numbers of picking boxes may be loaded on one cart.

For example, as shown in FIG. 1, when 15 picking boxes are loaded on the cart, the cart may include three layers, and each of the three layers may be loaded with five picking boxes. In addition, for example, the picking boxes may be numbered from an upper layer to a lower layer. In other words, first to fifth picking boxes may be positioned on the upper layer, sixth to tenth picking boxes may be positioned on a middle layer, and eleventh to fifteenth picking boxes may be positioned on the lower layer. However, since the picking boxes may be arranged differently, the embodiments are not limited thereto.

FIG. 2 is a conceptual diagram for describing a method for assisting proximity sensor-based product picking according to another embodiment of the present invention.

Referring to FIG. 2, according to another embodiment of the present invention, a cart loaded with a plurality of picking boxes may move on a rail installed in advance. In this case, the rail may stop operating when the cart is positioned at a reference point of a region where a current picking target product is displayed, so that the cart may move to the region where the current picking target product is displayed.

For example, among rectangles formed of dotted lines in FIG. 2, a large rectangle may represent the cart loaded with the picking boxes, and a small rectangle may represent the reference point. In other words, when the cart reaches within a predetermined distance from the reference point, it may be determined that the cart has reached the region where the current picking target product is displayed, so that the rail may stop operating. In this case, an LBS-based proximity sensor may be positioned at the reference point, and it may be determined whether the cart is positioned within the predetermined distance from the reference point based on a sensing value derived from the proximity sensor.

In addition, a light emitting diode (LED) may be present at the reference point. Alternatively, for example, the LED may always emit a light, and may indicate the reference point to a user. Alternatively, for example, the LED may emit a light when the cart reaches within the predetermined distance, which may indicate to the user that the cart has reached a region of the user. However, a turn-on/off or light-emitting state of the LED may be operated according to various conditions based on settings, so that the operation of the LED is not limited to the operation described above.

In other words, in a case where the cart moves on the rail according to another embodiment, when the cart reaches within the predetermined distance from the reference point on the rail, the rail may stop, and the user may perform a picking operation. In addition, when the user inputs picking completion information through a user terminal, a rail device may receive the picking completion information, and the rail device may move the cart to a next region for a next picking operation.

In addition, according to one embodiment of the present invention, in addition to the picking through the movement of the cart as described above, a scheme for easily managing many orders from a large-order customer company through a user terminal may be provided. In this case, the large-order customer company may represent a customer company in which a total number of orders is greater than or equal to a preset threshold, and may represent a customer company that is set by a manager in advance, but the large-order customer company is not limited thereto. This will be described below with reference to FIGS. 3 to 7.

FIGS. 3 to 7 are views showing screens of a user terminal for managing and processing an order from a large-order customer company according to one embodiment of the present invention.

FIGS. 3 to 7 may be screens showing a scheme for managing and processing a series of orders from a large-order customer company.

Figure 3:
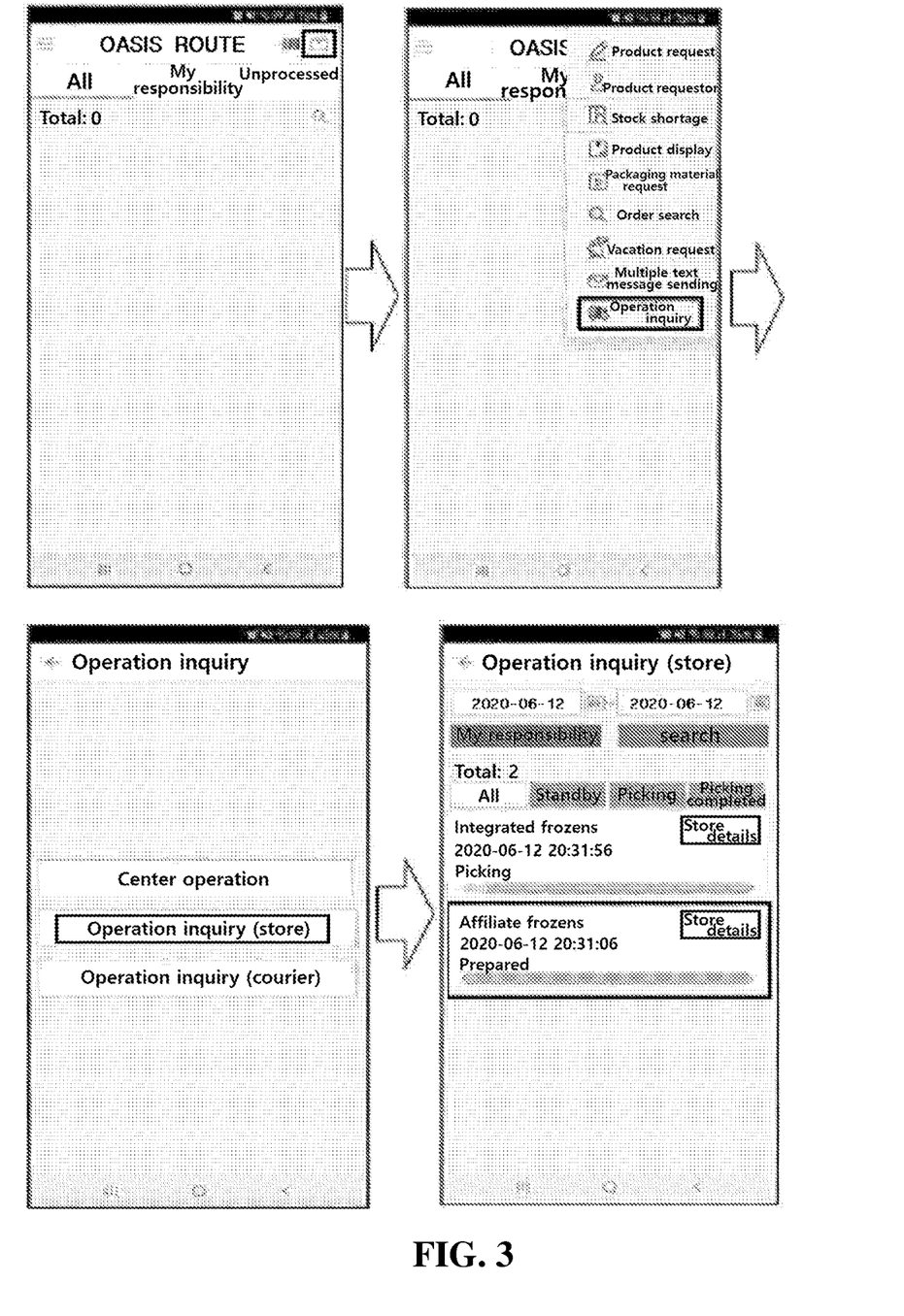

First, referring to FIG. 3, login may be performed by inputting account information of a user. In this case, the account information may include an ID and a password, or a separate certificate may be used.

According to one embodiment, when the account information is obtained from the user, the login may be performed based on the obtained account information, and information on a current operation of the user may be provided on a screen. For example, the information on the current operation of the user may include all operation information, my responsibility operation information, or unprocessed operation information.

The user may click a menu button positioned at a top right of the screen, so that various information may be further provided according to one embodiment. For example, according to one embodiment, information on a product request, information on a product requestor, information on stock shortage, information on product display, information on a packaging material request, information on order search, information on a vacation request, information on multiple text message sending, or information on operation inquiry may be provided to the user through a menu.

For example, when the user clicks operation inquiry, the information on the operation inquiry may be checked. In addition, according to one embodiment, when the user clicks the operation inquiry, the information on the operation inquiry may be provided on the screen. In this case, the information on the operation inquiry may be classified into a center operation, operation inquiry (store), and operation inquiry (courier), and one of the center operation, the operation inquiry (store), and the operation inquiry (courier) selected by the user may be provided to the user.

For example, when the user clicks the operation inquiry (store), the user may perform search by inputting or checking date information positioned at a top on a next screen, and an operation list and progress rate information corresponding to a date may be provided on the screen. In this case, the operation list may include at least one operation information, and the progress rate information may be provided for each operation information.

Figure 4:
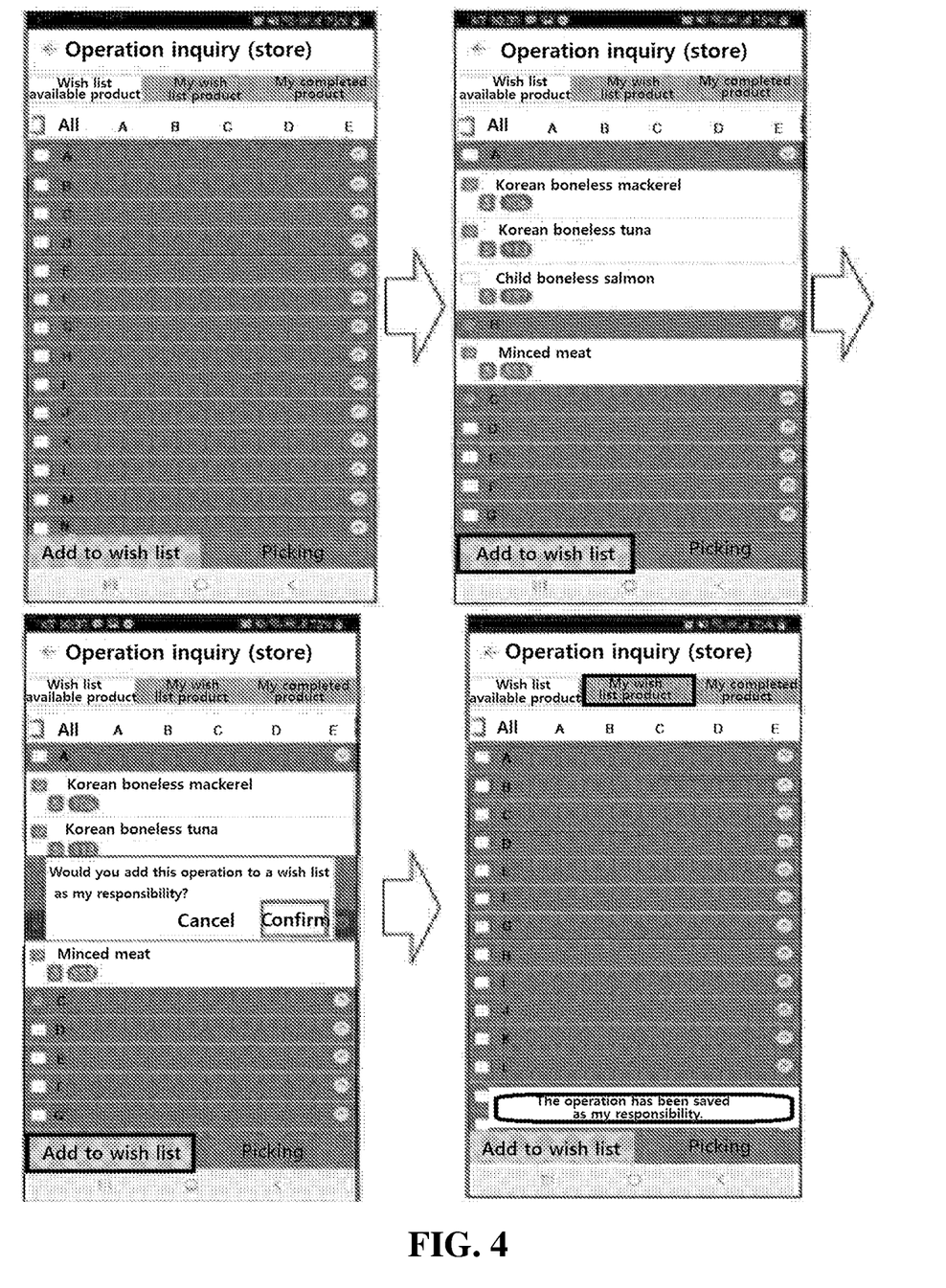

Thereafter, referring to FIG. 4, the user may select one of the operation informations in the operation list, and information on detailed operations included in the operation information may be provided. In this case, the information on the detailed operations may include information on large-order customer companies, and may be classified for each large-order customer company. In this case, the user may select a specific large-order customer company to check a list of products ordered by the specific large-order customer company on the same screen.

Thereafter, the user may select a large-order customer company or select a specific product from a list of products ordered by the large-order customer company, and may add a selected item to a wish list. In this case, the wish list may be provided to prevent a picking operation for a product list or a product from being repeatedly performed by a plurality of users at the same time, and when the wish list is selected, a person who is responsible for the operation may be set as a user. Alternatively, for example, when the user selects the wish list and desires to cancel the wish list, the user may select wish list cancelation. In this case, the wish list may request confirmation from the user once more through a pop-up window. The screen may include tabs including a wish list available product tab, a my wish list product tab, and a my completed product tab. The screen for showing the information on the detailed operations described above and performing the wish list may be a screen according to the wish list available product tab.

Figure 5:
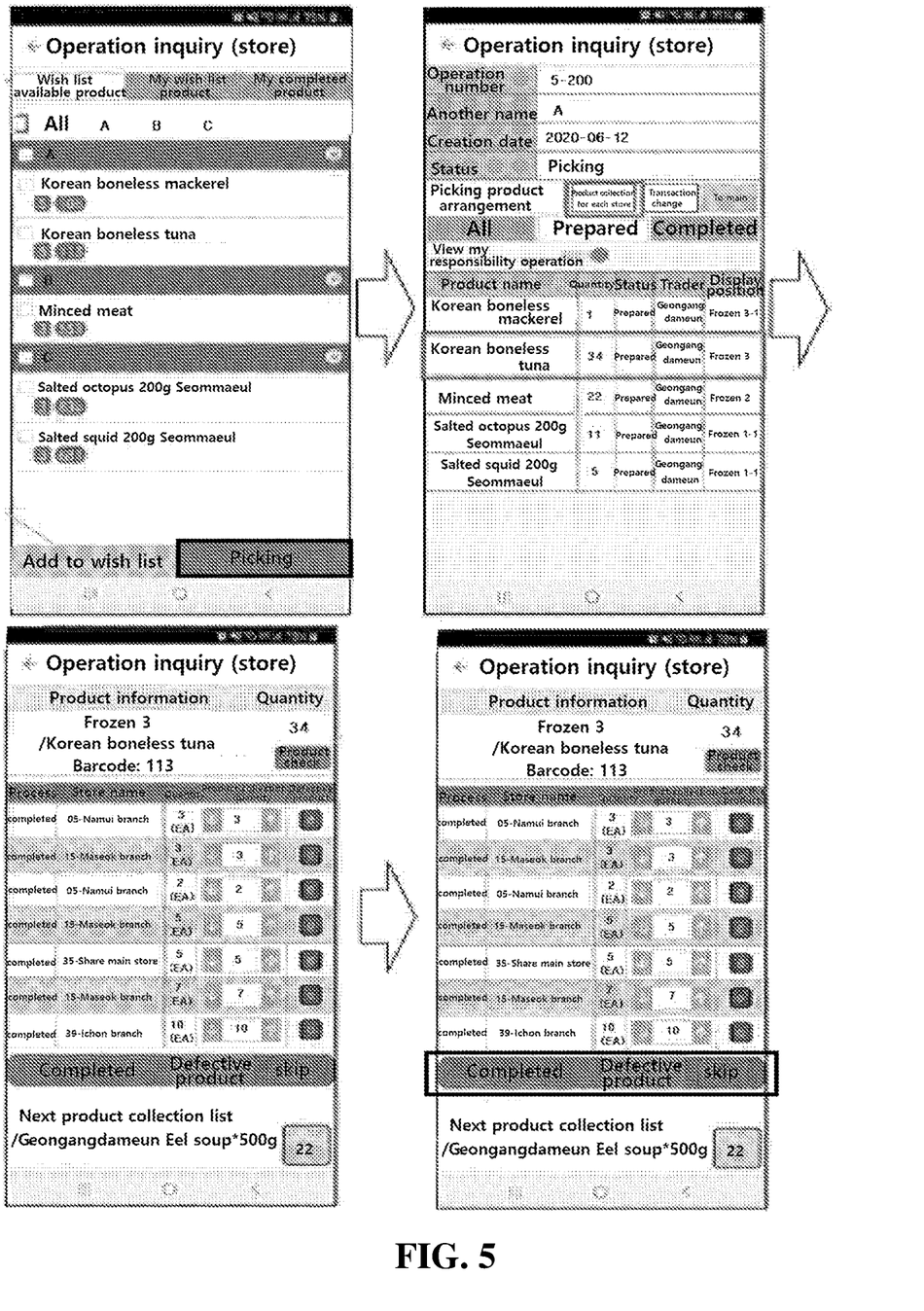

Referring to FIG. 5, when the user adds a specific large-order customer company or a specific product to the wish list, the user may click the my wish list product tab at the top to check a list of products of the specific large-order customer company added to the wish list or the product added to the wish list. When the user checks the list of products or the product added to the wish list by the user to find out there is no abnormality, the user may select picking to start a picking operation. For example, when the picking starts, the user may perform the picking on a cart that has reached a region where the user is positioned. Alternatively, the user may perform the picking by moving around with the cart.

For example, when the user selects the picking to allow the picking to start, operation information including an operation number, an another name, a creation date, and a status may be provided on the screen, and information on a picking target list may also be provided. The information on the picking target list may list picking target products in the picking target list in various ways. For example, the information on the picking target list may list the picking target products for each store so that product collections for each store may be easily recognized. In addition, the information on the picking target list may provide information on the picking target product, and the information on the picking target product may include information on a product name, a quantity, a status, a trader, and a display position. In this case, the trader may represent a large-order customer company.

In addition, according to one embodiment, a serial number of the picking target product may be provided through the screen. In this case, the serial number may be represented by barcode information, and may represent only a number of three figures. In this case, when last three figures of a barcode of the product are the same as the number of three figures displayed on the screen, the user may confirm that the product is the picking target product, so that accuracy of the picking operation may be increased.

Thereafter, the user may select a specific picking target product from the picking target list described above, and according to one embodiment, detailed quantity information for each store of a large-order customer company that orders the specific picking target product may be provided to the user. In this case, the detailed quantity information for each store may include information on a processing status, a store name, a quantity, a product collection quantity, and a defective product. The user may check a detailed quantity of each store to pick the picking target product, and may perform the picking to increase the product collection quantity. For example, when the product collection quantity is increased to be greater than a picking quantity, the product collection quantity may be reduced.

Referring to FIG. 6, when the picking is completed by the same quantity as the detailed quantity for each store, the user may set the product collection quantity to be the same as the detailed quantity for each store, and switch the processing status to completion. In this case, the user may select the large-order customer company positioned at the top to switch the screen to a product list of another large-order customer company.

For example, when picking of all products of a large-order customer company currently being picked is completed, and statuses of all the products are switched to completion, the user may perform a completion positioned at a bottom of the screen. In this case, the picking of all the products of the large-order customer company may be regarded as being completed, and the user may select a next large-order customer company to continuously perform the picking operation. In addition, when the completion is performed for all large-order customer companies added to the wish list by the user or all products added to the wish list by the user, the user may return to the screen that displays the operation information to perform the completion for the operation.

Referring to FIG. 7, when the completion for the operation is performed, the user may inquire the operation again to confirm that the completion for the operation has been performed, so that the user may check that a progress rate is changed. For example, the user may perform an additional picking operation through the process described above by reselecting an operation in which a progress rate has not yet reached 100%. Alternatively, the user may click my responsibility to check information on an operation or a product completed by the user, information on an operation or a product that is unprocessed, or information on an operation or a product being prepared. Furthermore, the may by select a specific operation to check information on completed products or uncompleted products among products in the picking target list included in the operation. In this case, after selecting the specific operation, the user may filter and check the information on the completed products or the uncompleted products included in the specific operation based on the store name, the status, or a change state. In this case, the information on the completed products or the uncompleted products included in the specific operation may include a store name, a quantity, a release quantity (or a product collection quantity), a receiver, an operator, or a status.

Figure 8:
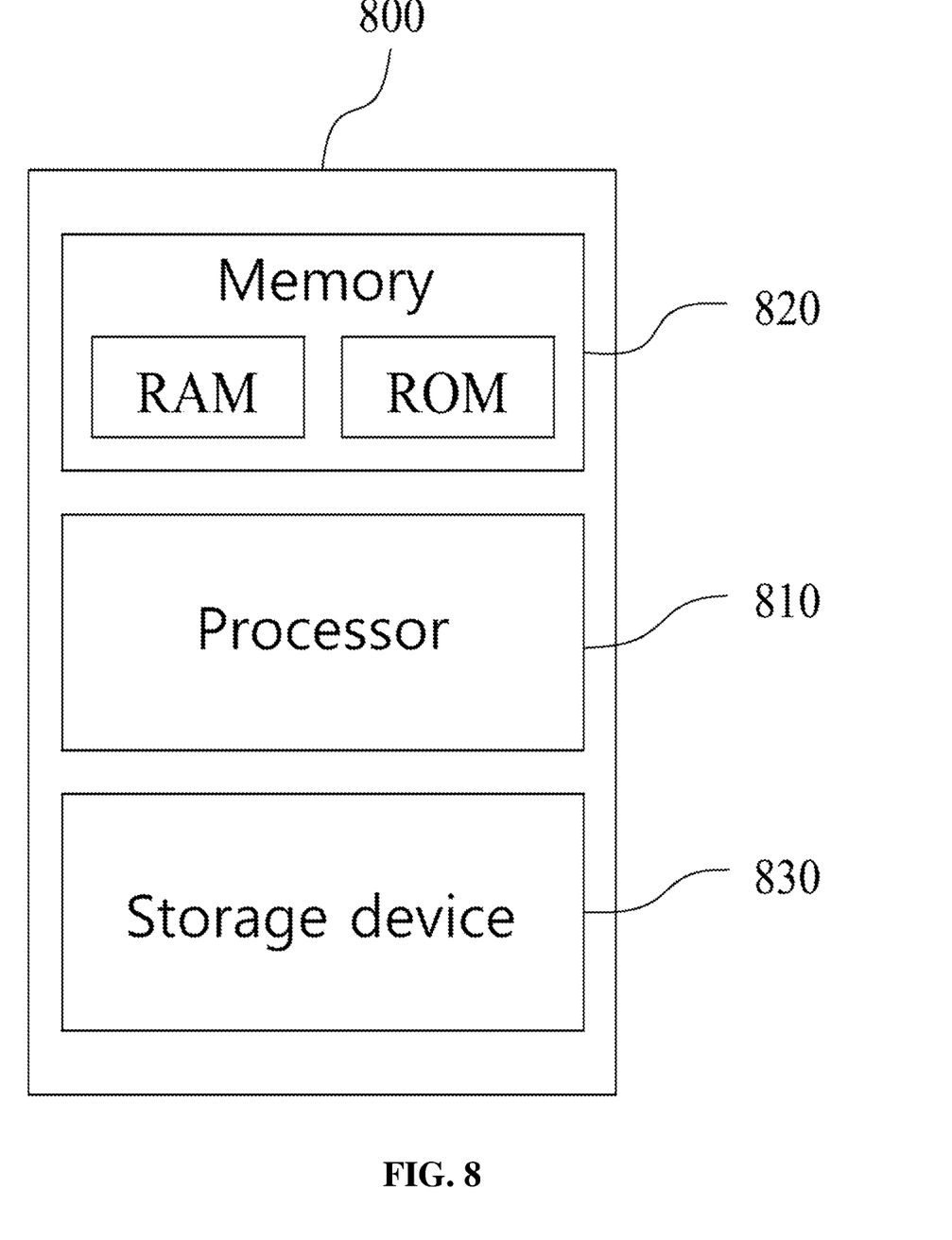
FIG. 8 is a block diagram showing an apparatus for assisting proximity sensor-based product picking according to one embodiment of the present invention.

FIG. 8 is a block diagram showing an apparatus for assisting proximity sensor-based product picking according to one embodiment of the present invention.

Referring to FIG. 8, according to one embodiment of the present invention, an apparatus 800 for assisting proximity sensor-based product picking may include at least one processor 810, a memory 820, and a storage device 830. For example, according to one embodiment, a user terminal may be a computable and portable user terminal such as a smartphone or a tablet, and functions according to an embodiment may be provided through an application. Alternatively, for example, the apparatus 800 for assisting the proximity sensor-based product picking may perform various operations while transmitting and receiving information to and from the user terminal. Alternatively, for example, the apparatus 800 for assisting the proximity sensor-based product picking may further include a driving module or a communication module, and the driving module may be a driving module of a rail or a driving module of a cart.

The processor 810 may execute a program command stored in the memory 820 and/or the storage device 830. The processor 810 may refer to a central processing unit (CPU), a graphics processing unit (GPU), or a dedicated processor on which methods according to the present invention are performed. Each of the memory 820 and the storage device 830 may be configured as a volatile storage medium and/or a non-volatile storage medium. For example, the memory 820 may include a read-only memory (ROM) and/or a random access memory (RAM).

The memory 820 may store at least one command executed through the processor 810. The at least one command may include: a command for deriving a current picking target product from a picking product list; a command for selecting a first user terminal positioned in a first region where the current picking target product is displayed; a command for moving a cart including a plurality of picking boxes within a predetermined distance from the first user terminal; a command for stopping the movement of the cart when the cart is positioned within the predetermined distance from the first user terminal; a command for providing information on the current picking target product to the first user terminal; and a command for deriving a next picking target product from the picking product list when picking completion information is received from the first user terminal. In this case, a distance between the cart and the first user terminal may be determined based on a proximity sensor. Alternatively, in this case, the proximity sensor may include an LBS-based proximity sensor.

For example, the at least one command may further include: a command for selecting a second user terminal positioned in a second region where the next picking target product is displayed; and a command for moving the cart within a predetermined distance from the second user terminal. In this case, a rail may be installed on a path between the first region and the second region, and the cart may move on the rail.

Alternatively, for example, a predetermined unique serial number for each product may be assigned to the current picking target product, the current picking target product may be arranged in the first region based on the serial number, and the information on the current picking target product provided to the first user terminal may include the serial number of the current picking target product.

In addition, the picking product list may be filtered based on information on a specific large-order customer company among large-order customer companies in which a total number of orders greater than or is equal to a preset threshold. Furthermore, the picking product list may include information on a required quantity of products ordered by the specific large-order customer company, and the picking completion information may be determined to be received when information that the ordered product has been collected until the requested quantity and a product collection quantity of the ordered product are equal to each other and information for converting a status of the ordered product into completion are received from the first user terminal. In this case, the picking product list may be sorted by the user based on picking target product information for each large-order customer company or order information of the large-order customer company for each product.

Figure 9:
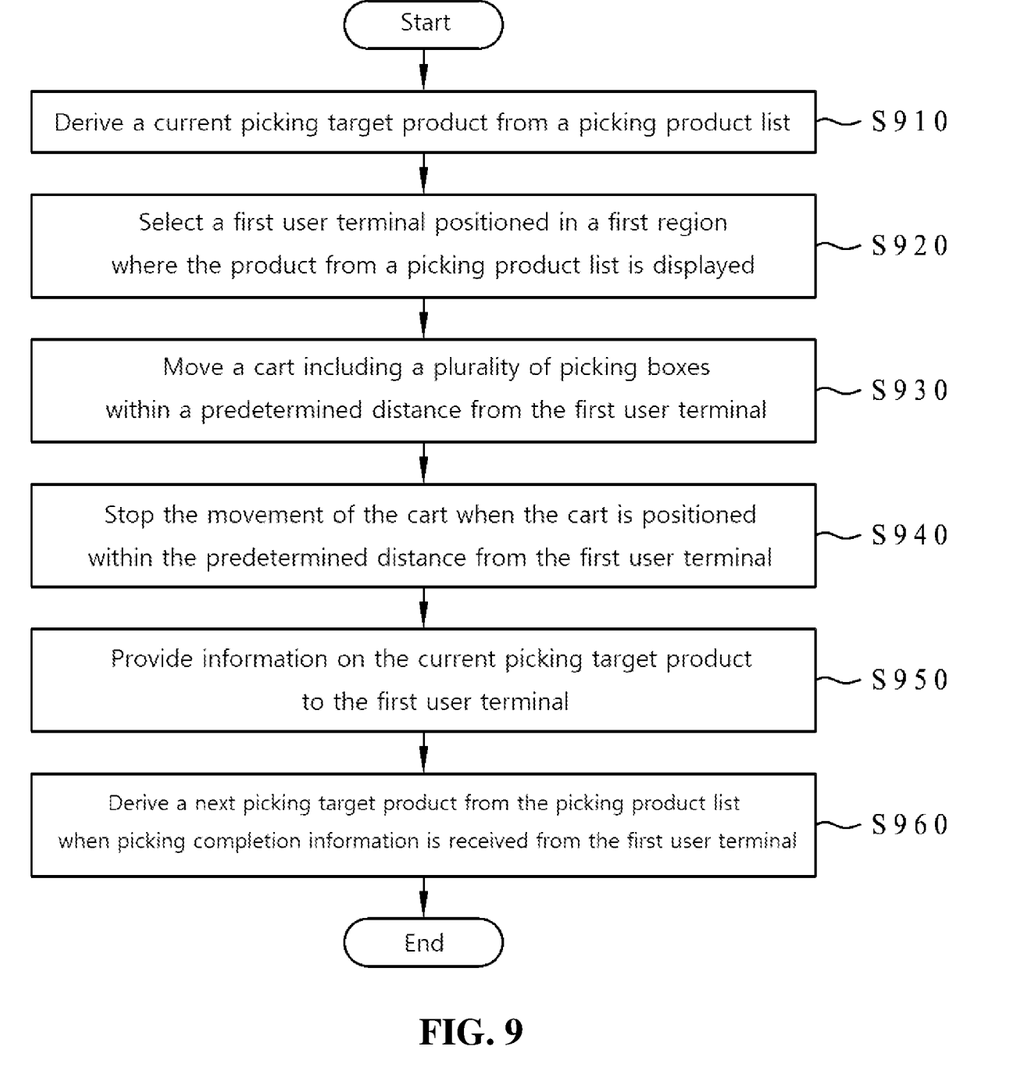
FIG. 9 is a flowchart of the method for assisting the proximity sensor-based product picking according to one embodiment of the present invention.

FIG. 9 is a flowchart of the method for assisting the proximity sensor-based product picking according to one embodiment of the present invention.

Referring to FIG. 9, according to one embodiment, a current picking target product may be derived from a picking product list (S910), and according to one embodiment, a first user terminal positioned in a first region where the current picking target product is displayed may be selected (S920). In this case, a reference terminal or a reference point positioned in the first region other than the first user terminal may be selected. In other words, according to one embodiment, position information of a reference for moving a cart may be obtained.

In addition, according to one embodiment, a cart including a plurality of picking boxes move within a predetermined distance from the first user terminal (S930), and the movement of the cart may be stopped when the cart is positioned within the predetermined distance from the first user terminal (S940). In this case, a distance between the cart and the first user terminal may be determined based on a proximity sensor. In other words, the proximity sensor may determine whether the cart is positioned within the predetermined distance from the first user terminal. For example, the proximity sensor may include an LBS-based proximity sensor.

For example, according to one embodiment, when the cart moves in a direction toward the first user terminal, a movement speed of the cart may be controlled. For example, according to one embodiment, the movement speed of the cart may be controlled based on information a distance between the cart and the first user terminal, information on whether a first user corresponding to the first user terminal is positioned within a designated region (e.g., the first region) of the first user, and grade information of a past processing speed of the first user. In this case, in order to derive the information on the distance between the cart and the first user terminal, according to one embodiment, position information of the reference for moving the cart and current position information of the cart may be may obtained. The current position information of the cart may be obtained by detecting a position of the cart based on Wi-Fi communication or the like, but the current position information of the cart is not limited thereto because various schemes may be used.

According to one embodiment, a user detection sensor or an occupancy detection sensor capable of detecting whether the first user is positioned may be positioned in the designated region (e.g., the first region), so that the information on whether the first user is positioned within the designated region may be obtained. In addition, according to one embodiment, a processing speed grade of each of various users may be derived based on past processing history information of the users. In other words, according to one embodiment, informations on a past number of pickings per hour of the user may be derived based on the past processing history information, and grade information of a past processing speed of the user may be derived based on an average of the informations on the past number of pickings per hour.

In detail, according to one embodiment, the information the distance between the cart and the first user terminal, the information on whether the first user corresponding to the first user terminal is positioned within the designated region (e.g., the first region) of the first user, and the grade information of the past processing speed of the first user may be used as factors or elements for determining the movement speed, respectively, and for example, the movement speed of the cart may be determined as shown in Mathematical Formula 1. However, the movement speed of the cart may be limited according to a maximum movement speed in consideration of operation safety issues. For example, the maximum movement speed may be 10 km/h. In other words, although the movement speed of the cart may be calculated as in Mathematical Formula 1, when a calculated value exceeds the maximum movement speed, the movement speed of the cart may be fixed to the maximum movement speed.

$$v = \frac{1}{20} \times \sqrt{1 + a \times (b+1)} \times d^2 \qquad \text{[Formula 1]}$$

In Mathematical Formula 1, v may represent a movement speed of a cart, and may have a unit of km/h. Further, d may represent information on a distance between a cart and a first user terminal, and may have a unit of m. In addition, a may represent information on whether a user is positioned within a designated region, may have a value of 1 when the user is positioned in the designated region, and may have a value of 0 when the user is not positioned in the designated region. Further, b may derive grade information of a past processing speed of a user, and may have a value of one of 0, 1, and 2 according to the grade information derived based on the past processing history information. In other words, the grade information may be classified into one of three types based on the past processing history information, and a value of b may be determined according to each grade.

For example, when an average value of the informations on the past number of pickings per hour is less than a first threshold, a processing speed may be classified as slow and determined as a third grade. In this case, the value of b may be determined as 0. In addition, when the average value of the informations on the past number of pickings per hour is greater than or equal to the first threshold and less than a second threshold, the processing speed may be classified as average and determined as a second grade. In this case, the value of b may be determined as 1. In addition, when the average value of the informations on the past number of pickings per hour is greater than or equal to the second threshold, the processing speed may be classified as fast and determined as a first grade. In this case, the value of b may be determined as 2.

In addition, the grade information may be determined as the third grade even when the average value of the informations on the past number of pickings per hour is greater than or equal to the first threshold when the past processing history information does not include information of past one month or more, that is, when the user has worked for less than one month. In addition, the grade information may be determined as the second grade even when the average value of the informations on the past number of pickings per hour is greater than or equal to the second threshold when the past processing history information does not include information of past three months or more, that is, when the user has worked for less than 3 months.

Thereafter, according to one embodiment, information on the current picking target product may be provided to the first user terminal (S950), and a next picking target product may be derived from the picking product list when picking completion information is received from the first user terminal (S960). In addition, according to one embodiment, a second user terminal positioned in a second region where the next picking target product is displayed may be selected, and the cart may move within a predetermined distance from the second user terminal. In other words, according to one embodiment, when picking of the current picking target product is completed, the next picking target product may be derived to perform a picking operation on the next picking target product by moving to the region where the next picking target product is positioned through the process described above.

For example, a rail may be installed on a path to the first region or a path between the first region and the second region, and the cart may move on the rail. In this case, the reference point may be positioned at a specific point on the rail, and an LED may be mounted at the specific point. However, the rail may not be necessarily present, and the cart may move toward the first region or the second region by operating the driving module based on information on a region where a product is displayed, a region where the cart may move, or the like.

In addition, according to one embodiment, a predetermined unique serial number may be assigned for each product, and the current picking target product may be arranged in the first region based on the serial number. In addition, the information on the current picking target product provided to the first user terminal may include the serial number of the current picking target product.

Furthermore, although not shown in FIG. 9, the picking product list may be filtered based on information on a specific large-order customer company among large-order customer companies in which a total number of orders is greater than or equal to a preset threshold.

In addition, the picking product list may include information on a required quantity of products ordered by the specific large-order customer company, and the picking completion information may be determined to be received when information that the ordered product has been collected until the requested quantity and a product collection quantity of the ordered product are equal to each other and information for converting a status of the ordered product into completion are received from the first user terminal. In this case, the picking product list may be sorted by the user based on picking target product information for each large-order customer company or order information of the large-order customer company for each product.

The operation described with reference with FIG. 9 may be one example, and may be some of operations according to one embodiment of the present invention. In other words, according to an embodiment of the present invention, it is obvious that various operations described with FIGS. 1 to 8 or some of the various operations may be further performed even though the operations are not shown in FIG. 9.

The operations according to the embodiment of the present invention may be implemented as a computer-readable program or code on a computer-readable recording medium. The computer-readable recording medium may include all types of recording devices in which data that is readable by a computer system is stored. In addition, the computer-readable recording medium may be distributed over computer systems connected through a network, so that the computer-readable program or code may be stored and executed in a distributed manner.

In addition, the computer-readable recording medium may include hardware devices specially configured to store and execute program commands, such as a ROM, a RAM, and a flash memory. The program command may include a high-level language code that may be executed by a computer by using an interpreter or the like as well as a machine code such as those generated by a compiler.

Although some aspects of the present invention have been described in the context of an apparatus, the description may also represent a description according to a method corresponding to the apparatus, in which a block or an apparatus may correspond to a method step or a feature of the method step. Similarly, aspects described in the context of a method may also represent a block or an item corresponding to the method or a feature of an apparatus corresponding to the method. Some or all of method steps may be performed, for example, by (or using) a hardware device such as a microprocessor, a programmable computer, or an electronic circuit. In some embodiments, one or more of the most important method steps may be performed by the device.

According to embodiments, a programmable logic device (e.g., a field programmable gate array) may be used to perform some or all of functions of the methods described herein. According to the embodiments, the field programmable gate array may operate together with a microprocessor for performing one of the methods described herein. In general, the methods are preferably performed by an arbitrary hardware device.

Although the exemplary embodiment of the present invention has been described above, it will be understood by those skilled in the art that various modifications and changes can be made to the present invention without departing from the idea and scope of the present invention as set forth in the appended claims.

The invention claimed is:

1. A method for assisting proximity sensor-based product picking, which is performed by an apparatus for assisting product picking, the method comprising:
   deriving a current picking target product from a picking product list;
   selecting a first user terminal positioned in a first region where the current picking target product is displayed;
   moving a cart including a plurality of picking boxes within a predetermined distance from the first user terminal;
   stopping the movement of the cart when the cart is positioned within the predetermined distance from the first user terminal;
   providing information on the current picking target product to the first user terminal; and
   deriving a next picking target product from the picking product list when picking completion information is received from the first user terminal,
   wherein a proximity sensor determines whether the cart is positioned within the predetermined distance from the first user terminal,
   the proximity sensor includes a location-based service (LBS)-based proximity sensor,
   the proximity sensor is positioned at a reference point corresponding to the first user terminal,
   the moving of the cart within the predetermined distance from the first user terminal includes moving the cart to the reference point through a rail installed in advance,
   a light emitting diode (LED) is positioned at the reference point,
   the stopping of the movement of the cart includes:
      stopping the movement of the cart when the cart is positioned within the predetermined distance from the reference point; and
      visually indicating reaching of the cart to a first user corresponding to the first user terminal by emitting a light from the LED,
   the method further comprises controlling a movement speed of the cart based on information on a distance between the cart and the first user terminal, information on whether the first user is positioned within a designated region of the first user, and grade information of a past processing speed of the first user, the grade information of the past processing speed is derived based on an average of information on a past number of pickings per hour of the first user based on past processing history information, the movement speed of the cart is determined based on Mathematical Formula:

$$v = \frac{1}{20} \times \sqrt{1 + a \times (b+1)} \times d^2,$$

where v represents a movement speed of a cart, d represents information on a distance between a cart and a first user terminal, a represents a value according to information on whether a first user is positioned within a designated region, and b represents a value according to grade information of a past processing speed of a first user, the a is derived as a value of 1 when the user is positioned within the designated region, and derived as a value of 0 when the user is not positioned within the designated region, the b is derived as 0 when the average of the information on the past number of pickings per hour of the first user is less than a first threshold, the b is derived as 1 when the average of the information on the past number of pickings per hour of the first user is greater than or equal to the first threshold and less than a second threshold, and the b is derived as 2 when the average of the information on the past number of pickings per hour of the first user is greater than or equal to the second threshold, the b is derived as 0 even when the average of the information on the past number of pickings per hour of the first user is greater than or equal to the first threshold when the past processing history information does not include information of past one month or more, the b is derived as 1 even when the average of the information on the past number of pickings per hour of the first user is greater than or equal to the second threshold when the past processing history information does not include information of past three months or more, and the movement speed of the cart is fixed to a preset maximum movement speed when the determined movement speed of the cart exceeds the preset maximum movement speed.

2. The method of claim 1, wherein a predetermined unique serial number for each product is assigned to the current picking target product, the current picking target product is arranged in the first region based on the serial number, and the information on the current picking target product provided to the first user terminal includes the serial number of the current picking target product.

3. The method of claim 1, wherein the picking product list is filtered based on information on a specific large-order customer company among large-order customer companies in which a total number of orders is greater than or equal to a preset threshold.

4. The method of claim 3, wherein the picking product list includes information on a required quantity of products ordered by the specific large-order customer company, and the picking completion information is determined to be received when information that the ordered product has been collected until the requested quantity and a product collection quantity of the ordered product are equal to each other and information for converting a status of the ordered product into completion are received from the first user terminal.

5. The method of claim 3, wherein the picking product list is sorted by the user based on picking target product information for each large-order customer company or order information of the large-order customer company for each product.

\* \* \* \* \*